June 13, 1961  G. L. GATCOMB  2,988,457
COATED NYLON FABRIC
Filed Oct. 31, 1956
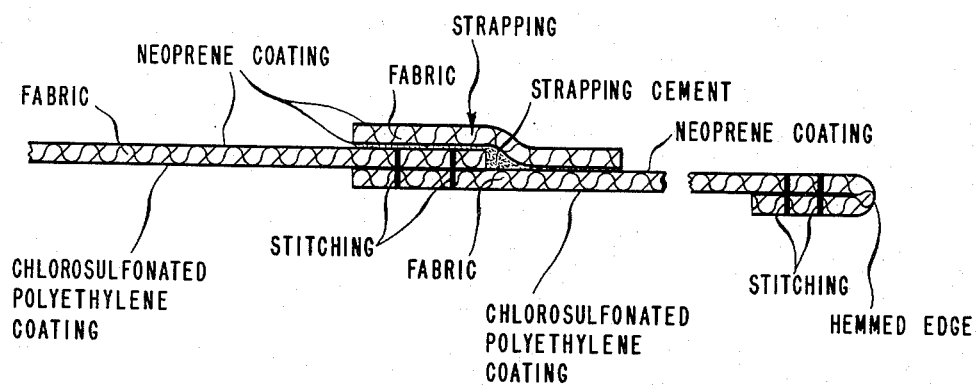
INVENTOR
GERALD L. GATCOMB
BY
AGENT United States Patent Office
2,988,457
Patented June 13, 1961

2,988,457
COATED NYLON FABRIC
Gerald L. Gatcomb, Fairfield, Conn., assignor to E. I. du Pont de Nemours and Company, Wilmington, Del., a corporation of Delaware
Filed Oct. 31, 1956, Ser. No. 619,560
1 Claim. (Cl. 117—68)

This invention relates to a coated fabric which is particularly useful as a paulin material. More particularly the present invention relates to a seamed paulin which is leakproof and weather resistant on the exterior side and exceptionally abrasion resistant on the interior side which normally rubs against objects being protected by the paulin.

Coated fabrics having neoprene coatings on both sides have been used rather extensively as paulin materials. Paulins made from such materials have certain desirable features, particularly with respect to the exterior or top side. Neoprene coated paulins are readily made with strong leakproof seams by the method well-known in the art of cementing a strap over a stitched lap joint. This method involves cementing neoprene surface to neoprene surface, which is an easy and efficient process. Other important advantages of neoprene coated paulins are their outstanding resistance to weather and good oil resistance. Neoprene coated fabrics, however, have certain definite limitations for use in paulins, particularly with respect to abrasion resistance.

When a neoprene coated fabric paulin is subjected to constant abrasion such as occurs where it is in contact with the sharp edges of objects being protected, the neoprene coating readily wears through. This obviously places a serious limitation on the paulin's useful service life.

More recently chlorosulfonated polymers of ethylene have become available. These new rubber-like materials are known for their unusual wearing qualities. A fabric coated with chlorosulfonated polyethylene will resist abrasive wear ten times as long as the same fabric coated with a like amount of neoprene. Other desirable properties of this material which make it a likely candidate for use in paulins are its good resistance to weather and chemicals. However, when making a paulin by combining two or more pieces of fabric coated on both sides with chlorosulfonated polyethylene, serious difficulties are encountered. The very property which gives this tough slippery coating its outstanding abrasion resistance makes it repellant to adhesives. It is therefore most difficult to produce a paulin with leakproof cemented seams from chlorosulfonated polyethylene coated fabric.

The improved paulin of the present invention overcomes the deficiencies of the prior art paulins and has demonstrated its marked superiority under extensive service tests on trucks operating under the most severe conditions.

This invention has as an object the provision of a coated fabric which is highly resistant to abrasion on one side, weather resistant on the other side and which lends itself readily to the formation of strong, leakproof and cemented strapped seams wherein two or more pieces of coated fabric are lap-joined. A further object is the provision of an improved seamed paulin which is not only leakproof and abrasion resistant, but also highly resistant to weather, oil and chemicals. A still further object is the provision of a paulin which is black on the exterior side and light colored on the interior side. Other objects will become apparent as the description of the invention proceeds.

These objects are accomplished in accordance with the present invention by applying to one side of a base fabric, preferably nylon, a coating composition comprising neoprene as the essential film-forming material and applying to the opposite side of the fabric a coating composition comprising chlorosulfonated polyethylene as the essential film-forming material.

In the drawing the single figure shows a fragment of the end product of this invention in which is illustrated an impregnated base fabric, a neoprene coating on the top side of the fabric, a chlorosulfonated polyethylene coating on the bottom side of the fabric, seam stitching at the lapped joint, seam covering strap over the lapped joint on the top side of the paulin, strapping cement between the neoprene surface and the seam covering strap and a hem at the edge of the paulin.

The following examples are given by way of illustration only and no limitations are intended thereby except as indicated in the appended claim. Unless stated otherwise the parts and percentage figures are expressed on a weight basis.

EXAMPLE I

A paulin material was made in accordance with the following procedure. A nylon base fabric composed of untwisted warp and weft yarns weighing about 5.0 ounces per square yard was used. The fabric is described more fully in Table 1, column C, of U.S. Patent No. 2,619,705. The nylon fabric was impregnated with the following primer composition:

*Primer composition*

| | Parts by weight |
|---|---|
| Neoprene | 100.00 |
| Paracoumarone-indene resin | 5.00 |
| Magnesium oxide | 4.00 |
| Calcium carbonate | 22.00 |
| Carbon black | 3.30 |
| Benzothiazyl disulfide | 0.30 |
| Phenyl-beta-naphthylamine | 1.67 |
| Zinc oxide | 5.00 |
| Pine tar | 3.33 |
| Hexamethylene diisocyanate [1] | 10.00 |
| | 154.60 |

[1] Any of the polyisocyanates disclosed in column 11 of U.S. Patent 2,415,839 can be used in place of hexamethylene diisocyanate.

The above composition was dispersed in sufficient volatile solvent to produce a consistency suitable for impregnating a nylon fabric by dipping the fabric therein.

The nylon fabric was dipped in the above described composition and the excess removed by passing between squeeze rolls followed by passing the treated fabric through a heat zone to evaporate the volatile solvent. There was deposited in and on the nylon fabric about 2.0 ounces per square yard of non-volatile components of the primer composition.

The impregnated fabric was then coated on one side with two doctor knife applications of the following neoprene coating composition:

*Neoprene coating composition*

| | Pts. by wt. |
|---|---|
| Neoprene latex, 60% solids | 100.00 |
| "Aquarex ME" [1] | 1.50 |
| "Marasperse CB" (partially desulfonated sulfonated lignin) | 1.20 |
| Di-beta-naphthyl para phenylenediamine | 3.00 |
| Sulfur | 1.00 |
| A-1 accelerator (thiocarbanilide) | 1.00 |
| Aluminum silicate | 10.00 |
| Zinc oxide | 15.00 |

[1] "Aquarex ME" is the sodium salt of the sulfate monoesters of a mixture of higher fatty alcohols consisting primarily of lauryl and myristyl derivatives.

| | Pts. by wt. |
|---|---|
| Carbon black | 30.00 |
| Petroleum oil | 15.00 |
| Oleic acid | 0.29 |
| Ammonia | 0.10 |
| | 178.09 |

The coated fabric was passed through a heat zone after each successive coat to dry the coating. Following the drying operation the coating was talced to reduce surface tackiness. Sufficient of the above described composition was applied to deposit about 2.8 ounces per square yard of non-volatile components.

The side of the impregnated fabric opposite the neoprene coating was next coated with the following described chlorosulfonated polyethylene composition:

*Chlorosulfonated polyethylene coating composition*

| | Parts by weight |
|---|---|
| Chlorosulfonated polyethylene [1] | 100.0 |
| Stabilite resin (hydrogenated rosin) | 5.0 |
| Triethyl lead maleate | 40.0 |
| Blanc fixe (barium sulfate) | 35.0 |
| Carbon black | .2 |
| Phthalic acid | 2.0 |
| Tetramethyl-thiuram-disulfide | 2.0 |
| 2-mercapto imidazoline | .5 |
| Trioctyl phosphate | 10.0 |
| | 194.7 |

[1] Made in accordance with U.S. Patent 2,586,363.

The above ingredients were mixed on a two roll rubber mill and then dissolved in sufficient toluol to produce a viscosity suitable for doctor knife application. The above described composition was applied by means of three doctor knife applications with forced drying between each coat. Sufficient composition was applied to deposit about 3.8 ounces of non-volatile components per square yard. The chlorosulfonated polyethylene coated side was then talced to reduce surface tackiness.

The coatings on each side of the fabric were cured by subjecting the material to a dry oven heat of 260° F., in which 1 hour was required to reach a temperature of 260° F. and then held at 260° F. for 2½ hours.

Each side of the cured coated fabric was subjected to the Wyzenbeek abrasion test as described in Federal Specification CCC-T-191b, Method 5304, dated May 15, 1951, using 240J emery cloth and changing the abradant every 500 strokes.

The neoprene coated side of the coated fabric withstood only 200 strokes before the coating was abraded through to the base fabric. The chlorosulfonated polyethylene coated side withstood 2,000 strokes before the coating was abraded through to the base fabric. Other properties which render the product useful as a paulin material are shown in the following table:

| Property | Test Method [1] | |
|---|---|---|
| Tensile Strength-Grab | 5,100 | >300 x >300 lbs. per 1" strip (Warp and Filler). |
| Trapezoid Tear Strength | 5,136 | 60 x 55 lbs. (Warp and Filler). |
| Mullen Hydrostatic Strength | 5,512 | 165 lbs. per sq. in. |
| Bursting Strength | 5,120 | >600 lbs. per sq. in. |
| Total Weight | | 13.6 oz. per sq. yd. |

[1] The method numbers referred to are those described in Federal Specification for "Textile Test Methods" CCC-T-191b, dated May 15, 1951.

A paulin measuring 200 inches square was formed from four 54 inch wide strips of the above described coated fabric. The four strips were stitched together along their opposite parallel edges with a two inch lap joint in which the neoprene coating of one strip was in contact with the chlorosulfonated polyethylene coating of the adjoining strip as illustrated in the drawing. A two inch strap of neoprene coated fabric (neoprene on both sides) was cemented over the stitched seam on the neoprene coated side of the paulin. The strapping cement used was formulated as follows:

| | Parts by weight |
|---|---|
| Neoprene | 100 |
| Phenol formaldehyde resin (Bakelite BR-14634) | 40 |
| Toluene | 230 |
| Mixed hydrocarbon solvent ("Solvasol") | 80 |
| Chlorinated rubber ("Parlon," 125 cps.) | 10 |
| Coumarone-indene resin ("Nevindene" R-3) | 10 |
| Magnesium oxide ("Maglite" D) | 8 |
| Hydrated silica ("Hi-Sil") | 5 |
| Antioxidant | 2 |
| | 485 |

In preparing the lapped cemented seams the surfaces to which the adhesive was applied were first roughened and cleaned. The cement was applied over the stitched lapped joint and on the strap and allowed to dry until tacky. Then the 2 inch wide strap of neoprene coated fabric was pressed into position over the joint.

The stitched cemented strap seams were sufficiently strong and waterproof to be serviceable in outdoor paulin applications.

In actual use the paulin is installed with the chlorosulfonated polyethylene side down, or in contact with the objects being protected. In order to facilitate identification of this abrasion resistant side, the chlorosulfonated polyethylene can be formulated to give white or light colored coatings. For example, instead of carbon black, a white pigment such as titanium dioxide can be used. Besides being useful for identification purposes, the light colored coating reflects light in the paulin-enclosed space.

In making the paulin of this invention substantially similar results can be obtained when other fabrics are used in place of the preferred nylon fabric described above, such as, e.g., fabrics formed of cotton, viscose rayon, polyacrylonitrile and polyethylene terephthalate.

The neoprene coating can be replaced with other tough elastomeric materials which can be readily cemented, such as natural rubber and such synthetic rubber-like materials as butyl rubber, rubbery copolymers of butadiene and acrylonitrile, and rubbery copolymers of butadiene and styrene, although neoprene is preferred.

The coating materials may be applied as solutions or dispersions by dipping the fabric, spreading or calendering the coating materials on the fabric. The coated fabric should then be heated to dry and cure the coating.

The paulin of the present invention was found to have surprisingly great utility for covering and protecting goods in transit. For example, when used to cover wooden crates and boxes during transit by truck, the paulin of this invention has at least ten times the normal service life of an ordinary paulin composed of a fabric coated on each side with a neoprene composition. In many cases the paulin remained undamaged for as many as twenty times the number of shipping miles it took to wear through the neoprene coating on the underside of conventional paulins.

The most common source of failure of paulins generally in shipment protecting applications is abrasion at points where the paulin is in contact with sharp edges or corners, such as the corners of boxes, crates or machinery. This type of abrasive wear is known in the art as "edge wear" and proves to be much more accelerated type of wear than that encountered in the customary flat surface abrasive wear. The paulin of this invention has its most surprising durability in its resistance to edge wear. This explains why it often has proven to be much more than ten times as durable as conventional paulins in spite of the ten times greater value obtained in the Wyzenbeek abrasion test.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claim as are stated therein, or required by the prior art.

The embodiments of the invention in which an exclusive property or privilege is claimed are defined as follows:

A coated fabric particularly adapted for use as a paulin material comprising:

(a) a woven base fabric consisting of nylon fibers, (b) said fabric being primed on each side with a composition comprising neoprene and a polyisocyanate, (c) an adherent surface coating containing a film former on one side of said primed fabric, said film former consisting essentially of neoprene, and (d) an adherent surface coating containing a film former on the other side of said primed fabric, said film former in said second mentioned surface coating consisting essentially of chlorosulfonated polyethylene.

References Cited in the file of this patent

UNITED STATES PATENTS

| | | |
|---|---|---|
| 1,073,858 | Kaufman | Sept. 23, 1913 |
| 2,406,830 | Haman et al. | Sept. 3, 1946 |
| 2,415,839 | Neal et al. | Feb. 18, 1947 |
| 2,420,974 | Petroske | May 20, 1947 |
| 2,502,353 | Sullivan | Mar. 28, 1950 |
| 2,624,886 | Herman | Jan. 13, 1953 |
| 2,630,398 | Brooks et al. | Mar. 3, 1953 |
| 2,650,184 | Biefeld | Aug. 25, 1953 |
| 2,702,764 | Painter et al. | Feb. 22, 1955 |
| 2,854,425 | Boger et al. | Sept. 30, 1958 |

OTHER REFERENCES

High Polymers, vol. XI, "Polyethylene," Interscience Publishers, Inc. (1956), page 362 relied on.